US008010341B2

(12) United States Patent
Achan et al.

(10) Patent No.: US 8,010,341 B2
(45) Date of Patent: Aug. 30, 2011

(54) ADDING PROTOTYPE INFORMATION INTO PROBABILISTIC MODELS

(75) Inventors: Kannan Achan, Mountain View, CA (US); Moises Goldszmidt, Palo Alto, CA (US); Lev Ratinov, Champaign, IL (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 11/855,099

(22) Filed: Sep. 13, 2007

(65) Prior Publication Data

US 2009/0076794 A1    Mar. 19, 2009

(51) Int. Cl.
*G06F 17/27* (2006.01)
*G06F 17/20* (2006.01)
*G06F 15/18* (2006.01)
*G10L 15/06* (2006.01)
*G10L 15/14* (2006.01)

(52) U.S. Cl. ............ 704/9; 704/1; 704/244; 704/256.1; 704/256.2; 706/12; 706/14

(58) Field of Classification Search ........................ None
See application file for complete search history.

(56) References Cited

U.S. PATENT DOCUMENTS

| | | | |
|---|---|---|---|
| 5,031,217 A | 7/1991 | Nishimura | 704/256.4 |
| 5,046,099 A | 9/1991 | Nishimura | 704/256.4 |
| 5,072,452 A | 12/1991 | Brown et al. | 704/256.4 |
| 6,023,673 A | 2/2000 | Bakis et al. | 704/231 |
| 6,999,925 B2 * | 2/2006 | Fischer et al. | 704/243 |
| 7,127,394 B2 | 10/2006 | Strong | 704/255 |
| 7,308,404 B2 * | 12/2007 | Venkataraman et al. | 704/255 |
| 7,827,032 B2 * | 11/2010 | Braho et al. | 704/251 |
| 2003/0212544 A1 | 11/2003 | Acero et al. | 704/9 |
| 2004/0210434 A1 | 10/2004 | Wang et al. | 704/9 |
| 2005/0182628 A1* | 8/2005 | Choi | 704/252 |
| 2006/0015326 A1 | 1/2006 | Mori et al. | 704/9 |
| 2006/0053015 A1 | 3/2006 | Lai et al. | 704/257 |
| 2006/0277028 A1* | 12/2006 | Chen et al. | 704/4 |
| 2009/0055183 A1* | 2/2009 | Yakhnenko et al. | 704/256.5 |

FOREIGN PATENT DOCUMENTS

EP    0321410    2/1993

OTHER PUBLICATIONS

Basu, S. et al., "A Probabilistic Framework for Semi-Supervised Clustering," *KDD*, 2004, 59-68.
Newman, D. et al., "Analyzing Entities and Topics in New Articles Using Statistical Topic Models," 2006, *LNCS 2975*, 93-104.
Strzarlkowski, T. et al., "Natural Language Information Retrieval: Trec-5 Report," 1998, 21 pages.
Xing, E., "Profile Hidden Markov Dirichlet-Multinomial Models for Motif Families," *Computer Science Division*, 2003, 1-13.

* cited by examiner

*Primary Examiner* — Matthew J Sked
(74) *Attorney, Agent, or Firm* — Woodcock Washburn LLP

(57) ABSTRACT

Mechanisms are disclosed for incorporating prototype information into probabilistic models for automated information processing, mining, and knowledge discovery. Examples of these models include Hidden Markov Models (HMMs), Latent Dirichlet Allocation (LDA) models, and the like. The prototype information injects prior knowledge to such models, thereby rendering them more accurate, effective, and efficient. For instance, in the context of automated word labeling, additional knowledge is encoded into the models by providing a small set of prototypical words for each possible label. The net result is that words in a given corpus are labeled and are therefore in condition to be summarized, identified, classified, clustered, and the like.

20 Claims, 8 Drawing Sheets

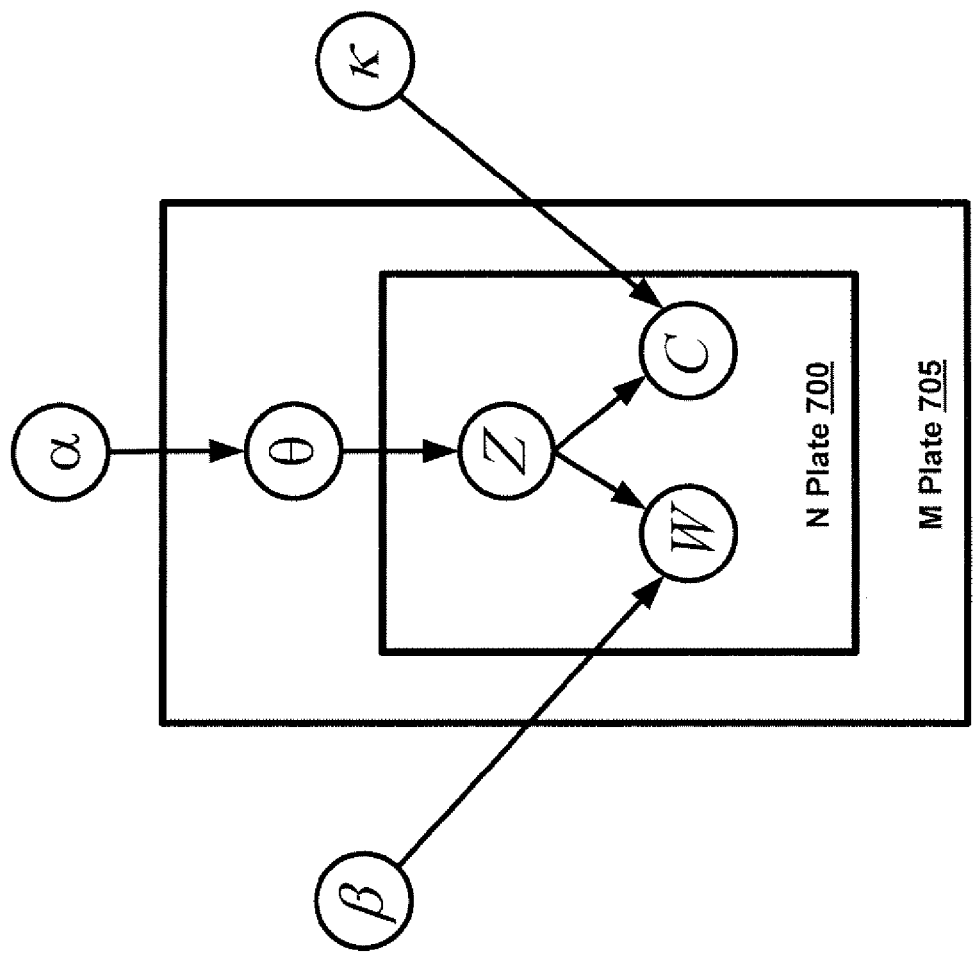
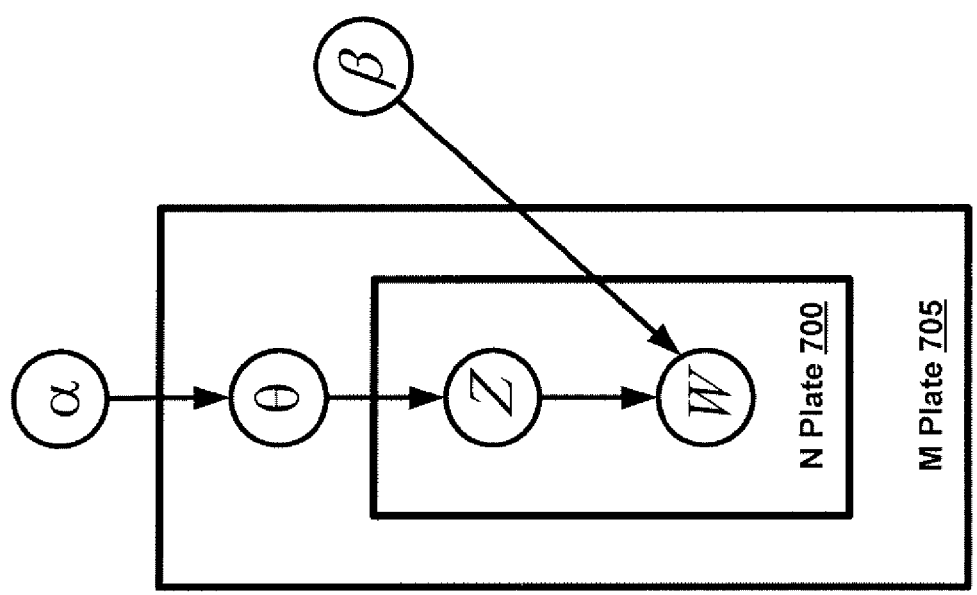
Fig. 7

ADDING PROTOTYPE INFORMATION INTO PROBABILISTIC MODELS

FIELD OF TECHNOLOGY

The presently disclosed subject matter relates to the field of computing, and more particularly, to automated information processing, although information processing is merely an exemplary and non-limiting field.

BACKGROUND

Vast amount of data currently exists in various types of media, be it storage, transmission, and the like. However, it is often times difficult to automatically extract meaningful and useful information, given the sheer quantity of any given data set. Thus, it would be advantageous to provide mechanisms for mining this data, where these mechanisms are configured to summarize, identify, classify, and/or cluster such data for a defined purpose. By way of example and not limitation, the task of labeling words in sentences with the objective of automatic summarization, identification, classification, and/or clustering, presents especially challenging problems that to this day have not been resolved in an accurate, effective, and efficient manner.

SUMMARY

Mechanisms to incorporate prototype information in probabilistic models for automated information processing are disclosed herein. For instance, Hidden Markov Models (HMM) and/or Latent Dirichlet Allocation (LDA) Models can automatically process vast amount of information and assign a pre-specified set of labels to words or other information components in a given corpus. Moreover, prototype information can inject prior knowledge about the nature of the relationship between the labels and the components into such models, thereby rendering them more accurate, effective, and efficient. By way of example and not limitation, in the context of word labeling, additional knowledge can be encoded by providing a small set of prototypical words for each possible label. The net result is that such words thereby aid summarization, identification, classification, clustering, and the like.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included:

FIG. 7 is a block diagram representing another exemplary and non-limiting probabilistic model, namely, the Latent Dirichlet Allocation (LDA), and the manner in which prototype information for such model could be incorporated therein.

DETAILED DESCRIPTION

Aspects of Adding Prototype Information Into Probabilistic Models

Figure 1:
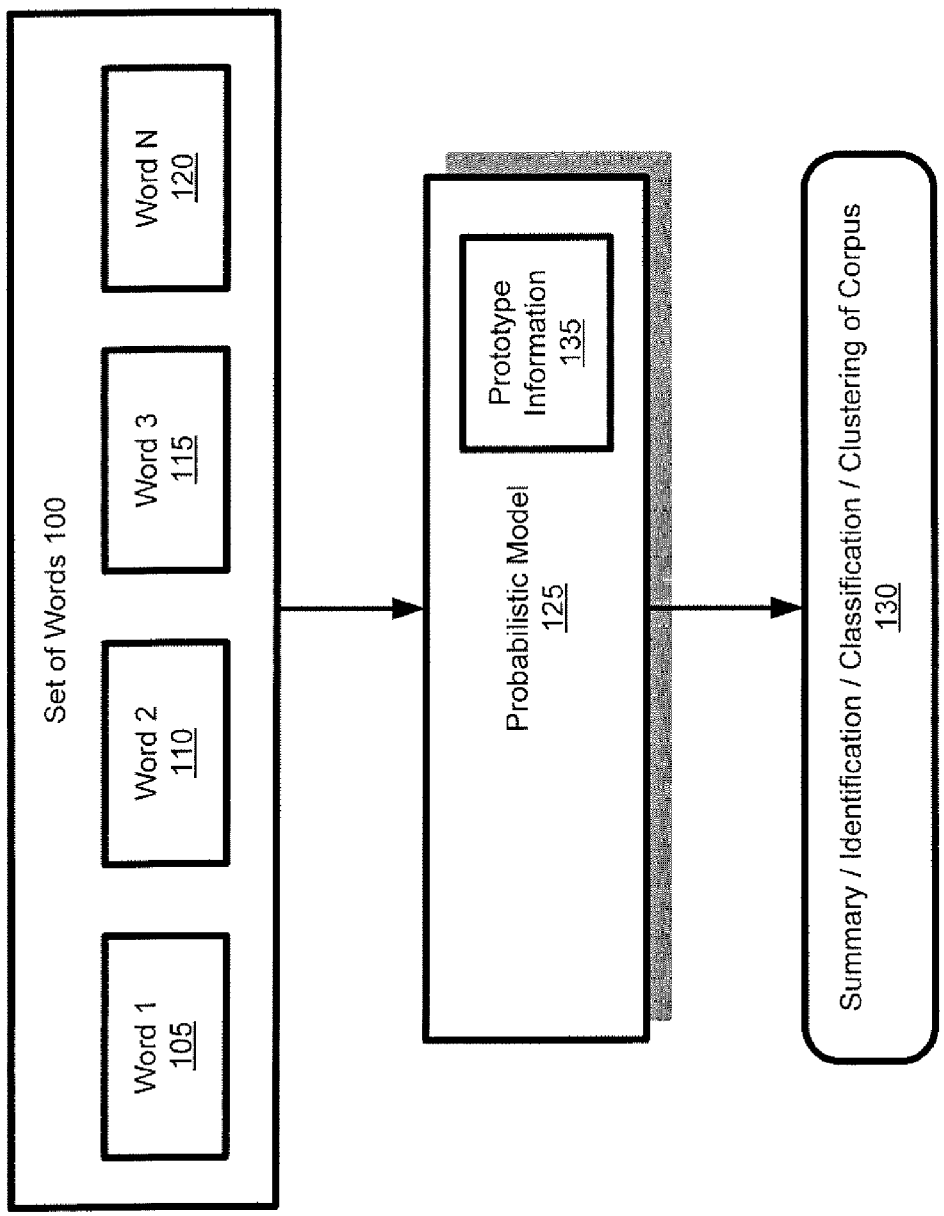
FIG. 1 is a block diagram representing an exemplary and non-limiting aspect of the present disclosure showing a set of words capable of being processed, such as being summarized, identified, classified, clustered, etc., using a probabilistic model with incorporated prototype information.

FIG. 1 is a block diagram representing an exemplary and non-limiting aspect of the present disclosure showing a set of words capable of being processed, such as being summarized, identified, classified, clustered, etc., using a probabilistic model with incorporated prototype information. In FIG. 1, a set of words 100 is presented, with words word 1 105, word 2 110, word 3 115, up to word N 120. These words can be processed using some probabilistic model 125. In other words, such a model 125 can assign meaning or labels to these words 105, 110, 115, 120 in order to structure this data into useful information.

Moreover, the probabilistic model 125 can use prototype information 135 to obtain more accurate, efficient, and effective results than it otherwise would obtain. The prototype information 135 can convey additional information to the model 125, thereby allowing the model 125 to converge on the desired result. It should be noted that a plurality of different and similar such models can be used in conjunction with a plurality of different and similar prototype information in this process.

Figure 2:
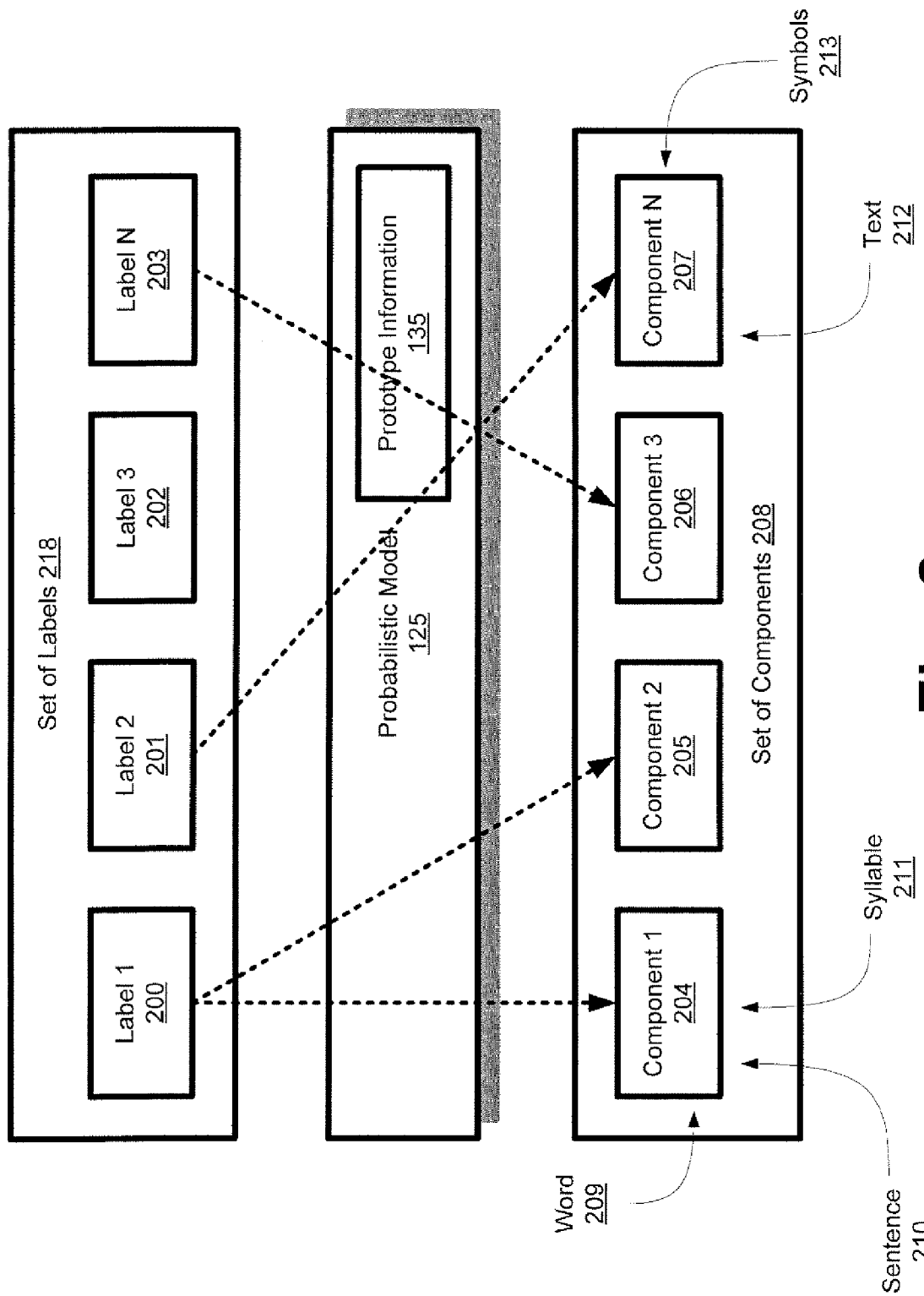
FIG. 2 is a block diagram representing a set of labels being applied to a set of components (which may include words, sentences, syllables, text, symbols, etc.) in order to process data to yield desired results.

FIG. 2 is a block diagram representing a set of labels being applied to a set of components (which may include words, sentences, syllables, text, symbols, etc.) in order to process data to yield desired results. A set of labels 218 is shown, with label 1 200, label 2 201, label 3 202, and label N 203. These labels 200, 201, 202, 203 can be mapped to a set of components 208. Thus, in FIG. 2, several components are shown, namely, component 1 204, component 2 205, component 3 206, and component N 207. As was indicated above, these "components" 208 could include (but are by no means limited to) words 209, sentences 210, syllables 211, text 212, symbols 213, etc. Similarly, the set of labels 218 could also include these 209, 210, 211, 212, 213 or other types of labels.

By way of example and not limitation, the set of components 208 could correspond to the sentence "1600 Pennsylvania Ave, D.C." In this example, the level of granularity in question could be word-level 209. Thus, component 1 204 could correspond to "1600," component 2 205 could correspond to "Pennsylvania," component 3 206 could correspond to "Ave.," and component N 207 could correspond to "D.C." Label 1 200, then, could be an "address," thus yielding the result that a number ("1600"), a full word ("Pennsylvania"), an abbreviation ("Ave."), and an acronym ("D.C.") all correspond to the label of "address". Thus, the sentence as a whole, corresponding to the set of components 208, could be summarized as disclosing the notion of an "address." Such summarization could be done automatically for kilobytes, megabytes, terabytes, etc. of data.

FIG. 2 shows a more generalized application of this specific example. Thus, as shown by the dashed arrows, label 1 200 could be attached to component 1 204 and component 2 205 (assuming these components 204, 205 are related in subject matter to the label 200), label 2 could be attached to component N 207, and label N 203 could be attached to component 3 206. It should be noted that not all the labels would have to be used, namely, label 3 202, since the subject matter of label 3 202 could possibly not exist in the corpus of the set of components 208. In any event, this attaching of labels 200, 201, 202, 203 to components 204, 205, 206, 207 could be performed by the aforementioned probabilistic model 125 with incorporated prototype information 135. In other words, this model-cum-prototype information 125, 135 can determine in an automatic manner the likelihood that a label should attach to a component. The prototype information can enhance the accuracy of such attaching, yielding a greater probability that labels and components are matched correctly.

Figure 3:
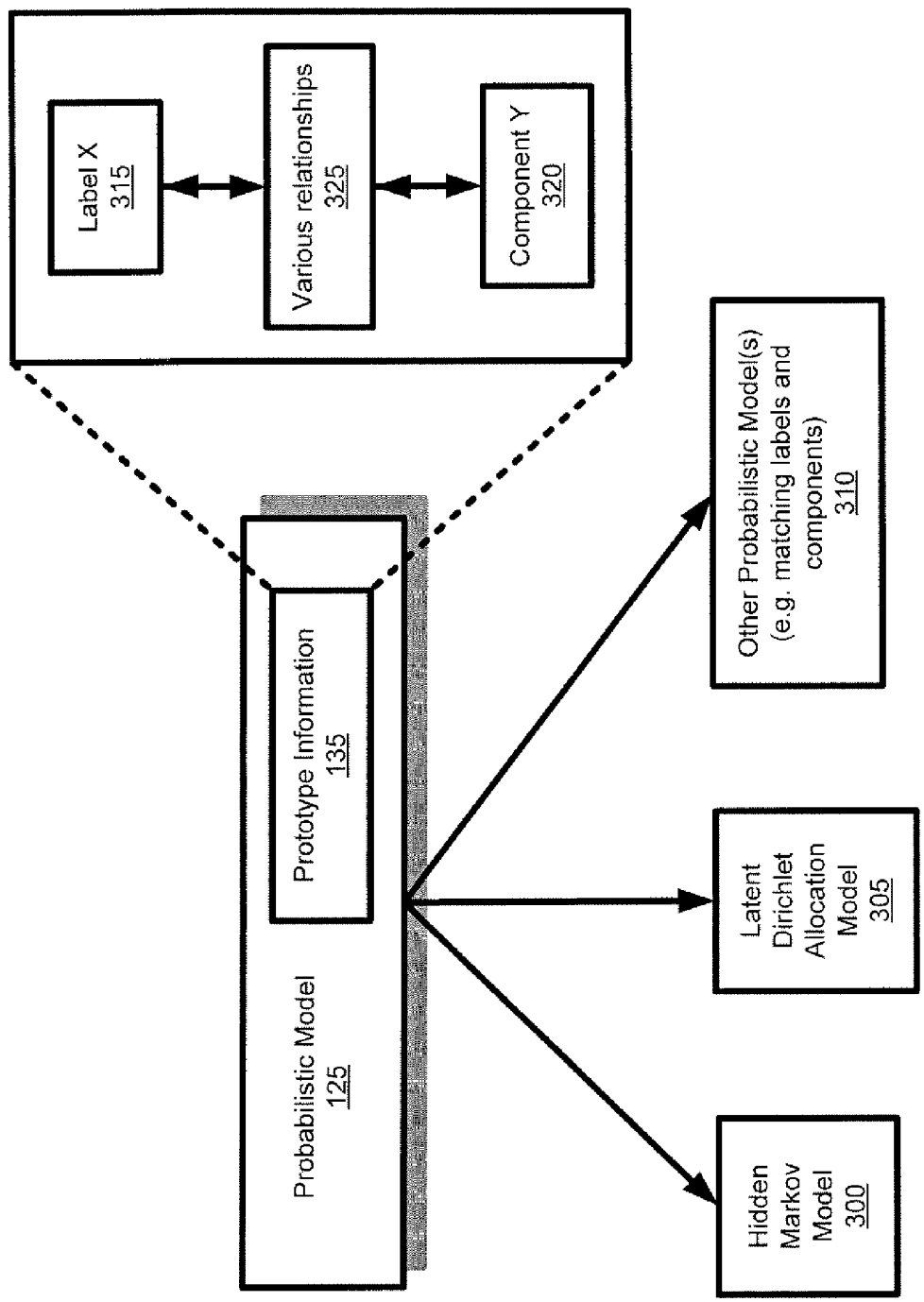
FIG. 3 is a block diagram representing the different types of probabilistic models in which prototype information can be used, and the details of such prototype information.

FIG. 3 is a block diagram representing the different types of probabilistic models in which prototype information can be used, and the details of such prototype information. The shown probabilistic model 125 can be instantiated as a Hidden Markov Model 300, a Latent Dirichlet Allocation Model 305, or some other similar model 310. The probabilistic model 125 can incorporate prototype information 135, which can comprise of labels, such as label X 315, and components, such as component 320 (as shown in FIG. 2). The labels and components can be related in various ways 325, including having a one-to-one relationship, a one-to-many relationship, a many-to-one relationship, many-to-many relationship, and the like. This prototype information 135 can enhance the accuracy of the probabilistic model 125 by essentially providing additional information to the information already available to the model 125.

Figure 4:
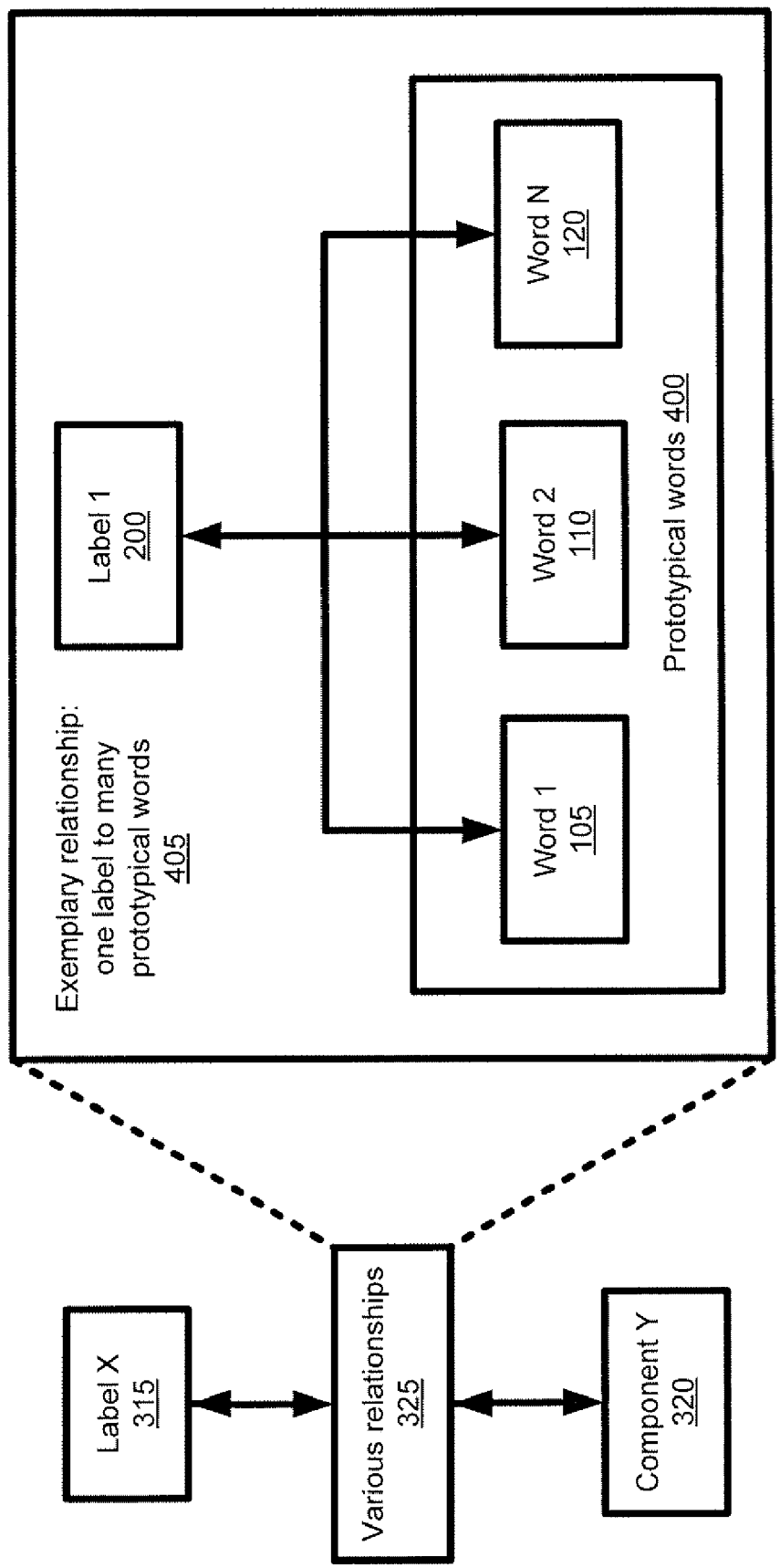
FIG. 4 is a block diagram representing a detailed view of prototype information in an exemplary and non-limiting scenario, where labels and words are related in a specific manner.

FIG. 4 is a block diagram representing a detailed view of prototype information in an exemplary and non-limiting scenario, where labels and words are related in a specific manner. Label X 315 can be related to component Y 320 in a one-to-many relationship. Thus, in FIG. 4, label 1 200 can be related to word 1 105, word 2 110, and word N 120, just like the label "address" can be related to prototype words "N.Y.C.," "L.A.," and "D.C.," respectively. In the scenario where the prototype information would contain a prototype word and label pair, such as "D.C." and "address," respectively, this information could be used to more accurately parse the above given example, "1600 Pennsylvania Ave., D.C."

Prototype Information in Hidden Markov Models (HMMs)

Figure 5:
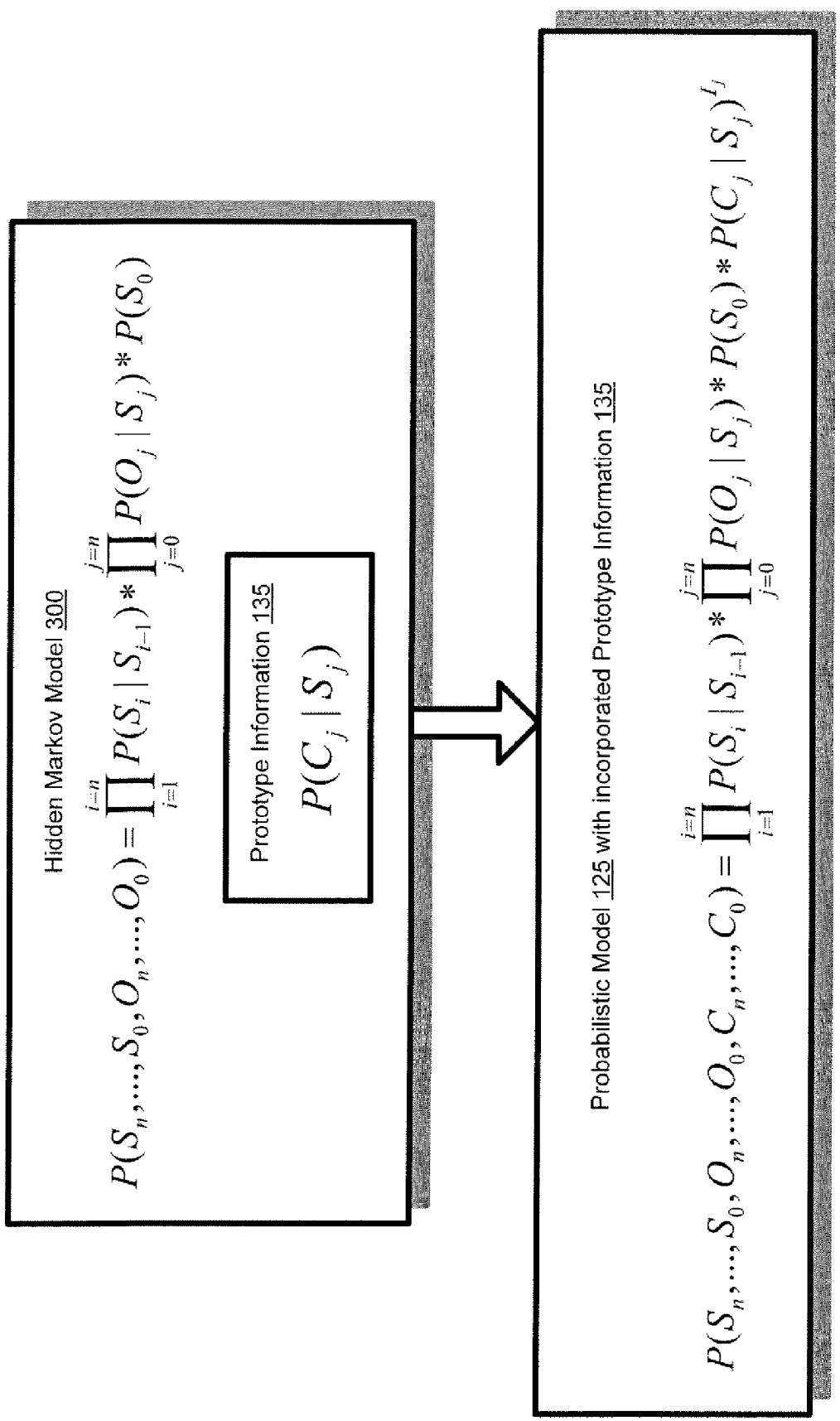
FIG. 5 is a block diagram representing one exemplary and non-limiting probabilistic model, namely, the Hidden Markov Model (HMM), and the manner in which prototype information for such model could be incorporated therein.

FIG. 5 is a block diagram representing one exemplary and non-limiting probabilistic model and the manner in which prototype information for such model could be incorporated therein. In an HMM, there can be a set of states S and a set of observations O. Each $S_i$ in S can take one of many discrete (and finite) values, and the same holds true of each $O_k$ in O. In the relevant domain, the states can take values from the possible set of labels, and the observations can be instantiated to the actual words in the corpus of words to be processed. Three sets of probability distributions can be used to represent a given HMM.

First, there is the transition probability $P(S_i|S_j)$, representing the probability of transitioning to state $S_j$ from state $S_i$. Second, there is the emission probability $P(O_j|S_j)$, representing the probability of making an observation $O_j$ in state $S_j$. And, third, there is the probability of the initial state in the Markov chain, or $P(S_0)$. Thus, the joint probability of a given sequence of N states and observations is given by:

$$P(S_n, \ldots, S_0, O_n, \ldots, O_0) = \prod_{i=1}^{i=n} P(S_i|S_{i-1}) * \prod_{j=0}^{j=n} P(O_j|S_j) * P(S_0) \qquad \text{Eq. 1}$$

Additional information can be added to the HMM in the form of a list of words and label pairs—these can be referred to as the "prototypes" (the previous figures also discuss some other aspects of prototype information). One way to incorporate this information into the probability equation above (Eq. 1) as additional evidence (additional to the actual observation O), is to add an additional "fictitious" observation $C_j$ each time that there is a prototype word in the corpus to be processed, and then parameterize the additional factor $P(C_j|S_j)$. Thus, following the addition of the prototype information to Eq. 1, the new equation reads:

$$P(S_n, \ldots, S_0, O_n, \ldots, O_0, C_n, \ldots, C_0) = \prod_{i=1}^{i=n} P*(S_i|S_{i-1}) * \prod_{j=0}^{j=n} P(O_j|S_j) * P(S_0) * P(C_j|S_j)^{I_j} \qquad \text{Eq. 2}$$

The term $I_j$ at the end of Eq 2., is an indicator variable that can be either 1 or 0, depending on whether $O_j$ is a prototype word or not, respectively. Thus, as a practical matter, the only difference between Eq. 1 and Eq. 2 is the term $P(C_j|S_j)$, which allows us to model the additional information provided by the list of prototypes.

For example, the word mo can be a prototype word for the label rent. It is easy to conceptually extend additional information to words that are not explicitly in the prototype lists. It can be assumed that there is a similarity function (explained in more detail, below) that given an arbitrary word, will produce a list of similar prototypes with some confidence. This same methodology can be used to incorporate information into the HMM. For instance, the word $ can be identified to be similar enough to the prototype word mo. Thus, in the HMM, a dangling node for the prototype label rent can be added to the state that has the word $ as an observation.

Figure 6:
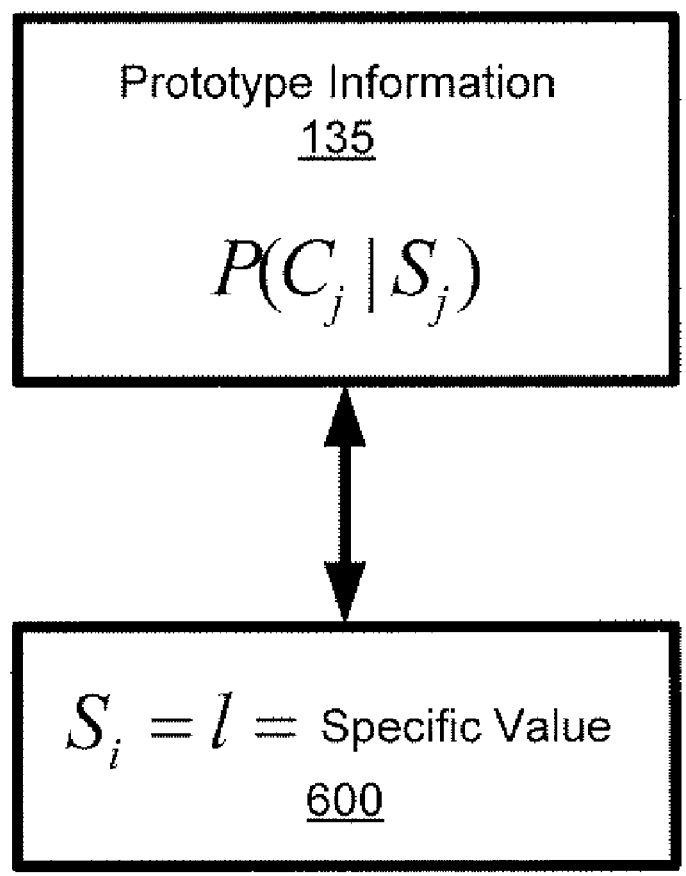
FIG. 6 is a block diagram representing the notion of quantification of prototype information in the model discussed with respect to FIG. 5.

FIG. 6 is a block diagram representing the notion of quantification of prototype information in the model discussed with respect to FIG. 5. Specifically, it illustrates the notion of quantifying the term $P(C_j|S_j)$, as this term is used in the Eq. 2 discussed with respect to FIG. 5. In one exemplary and non-limiting aspect of the present disclosure, the knowledge that a specific word w is closely related to a specific label l can be directly incorporated into in to the HMM model. In the term $P(C_j=p|S_j=l)=\delta$, p can be a "token" representing a prototype (and it can be related to l), and $\delta$ can be set to a relatively high value with respect to any other options for $C_j$. There are a plurality of ways to incorporate prototype information in the HMM (viz., EM algorithm, gradient descent), and the implementation choice is largely an engineering decision.

Prototype Information in Latent Dirichlet Allocation (LDA) Models

LDA is a powerful probabilistic latent variable model that models the distribution over topics pertaining to a corpus (e.g. document collection) in an unsupervised and fully Bayesian setting. Here, each word W can be modeled as a mixture of latent topics Z, which in turn depends on a multinomial $\theta$ parameterized by a Dirichlet distribution (where $\alpha$ is used to parameterized the Dirichlet distribution). In a generative model shown in FIG. 7, the N plate 700 containing z and w can be at the word-level and the outer plate M 705 containing $\theta$ can be at the document level. Exact inference in the model can be intractable due to the coupling between $\theta$ and $\beta$. To incorporate prototypical evidence pertaining to the label (topic) of W, the model on the left of FIG. 7 can be augmented with extra evidence node C that is a child of Z. The emission probability $P(C_i|Z_j)$ can be parameterized by $\kappa$ (it should be noted that $\kappa$ will be a square matrix). As in the case of HMMs, there will be no significant change to interference and learning algorithms. The presence of additional information can potentially lead to the assignment of different labels, even for identical words in a document due to the context information in C. For example, two numbers in an advertisement (document) can correspond to different labels, say, address and rent.

Figure 8:
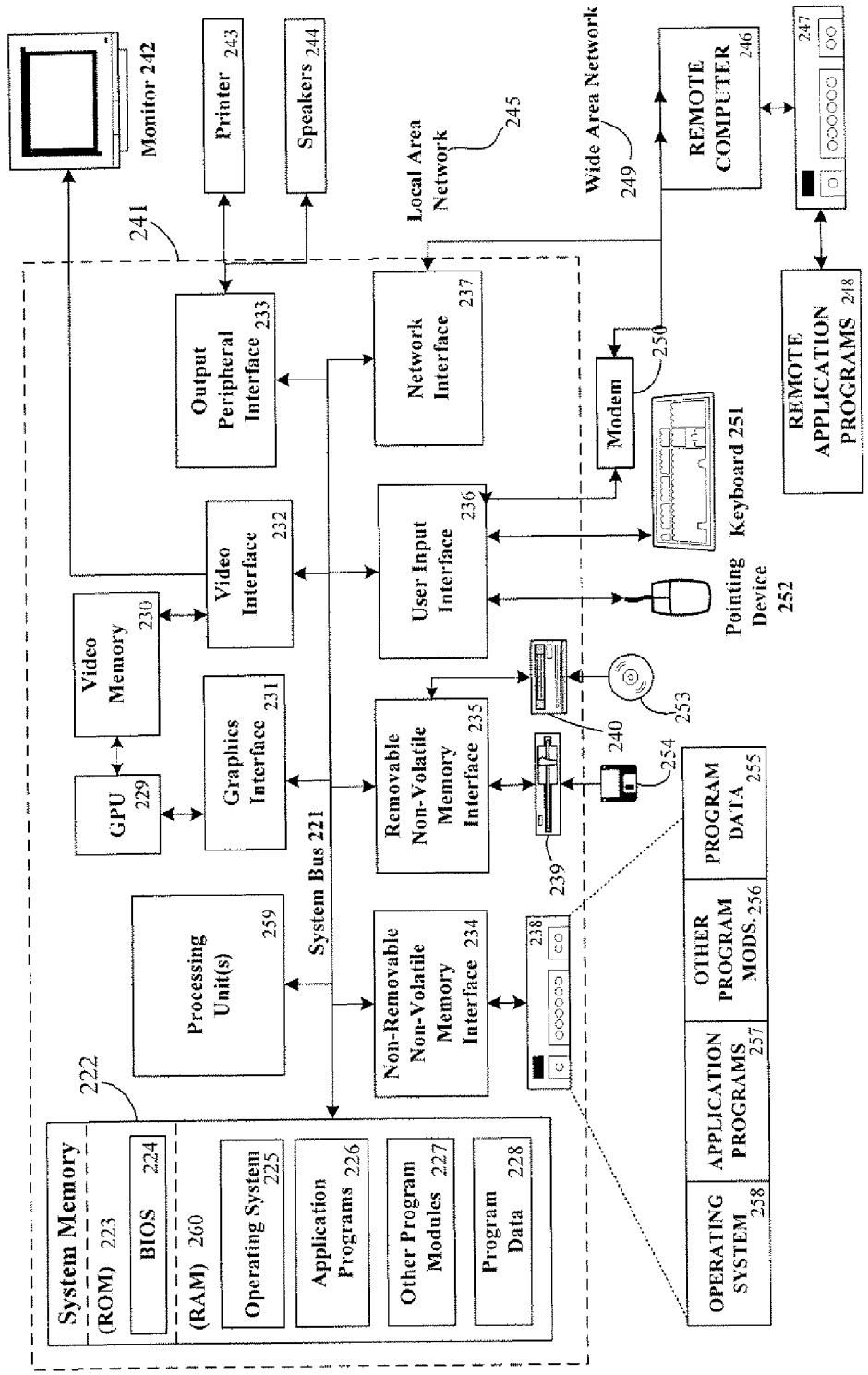
FIG. 8 is a block diagram representing an exemplary computing environment containing various devices that could be used in conjunction with the various aspects disclosed herein.

Exemplary Computing Environment for Probabilistic Models and Incorporated Prototype Information FIG. 8 is a block diagram representing an exemplary computing environment containing various devices that could be used in conjunction with the various aspects disclosed herein. Referring to FIG. 8, shown is a block diagram representing an exemplary computing device suitable for use in conjunction with implementing the systems, methods, and computer readable media that incorporate prototype information into probabilistic models. The various devices shown in FIG. 8 can carry out in software, hardware, or firmware form the aspects mentioned above. These aspects can reside and/or be executed in such a computing environment 220 as shown in FIG. 8. The computing environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary computing environment 220.

Aspects of the presently disclosed subject matter are operational with numerous other general purpose or special purpose computing systems, environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, a graphics processing unit 229 (and a graphics interface 231), a video memory 230 (and a video interface 232), and a system bus 221 that couples various system components including the system memory 222 to the processing unit 259. The system bus 221 may be any of several types of bus structures, including a memory bus or memory controller, a peripheral bus, and a local bus using any of a variety of bus architectures. By way of example and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 241 typically includes a variety of computer-readable media. Computer-readable media can be any available media that can be accessed by computer 241, and includes both volatile and nonvolatile media, removable and non-removable media. By way of example and not limitation, computer-readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 241.

Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example and not limitation, FIG. 8 illustrates operating system 225, application programs 226, other program modules 227, and program data 228.

The computer 241 may also include other removable/non-removable, volatile/nonvolatile computer storage media. By way of example only, FIG. 8 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 8 provide storage of computer readable instructions, data structures, program modules and other data for the computer 241. In FIG. 8, for example, hard disk drive 238 is illustrated as storing operating system 258, application programs 257, other program modules 256, and program data 255. Note that these components can be either the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 8. The logical connections depicted in FIG. 8 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example and not limitation, FIG. 8 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high-level procedural or object oriented programming language to communicate with a computer system. However, the program(s) can be implemented in assembly or machine language, if desired. In any case, the language may be a compiled or interpreted language, and may be combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 8, the systems and methods provided herein cannot be construed as limited in any way to a particular computing architecture. Instead, the presently disclosed subject matter should not be limited to any single embodiment, but rather should be construed in breadth and scope in accordance with the appended claims.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, various mechanisms were disclosed for processing information. However, other equivalent mechanisms to these described aspects are also contemplated by the teachings herein. Therefore, the present disclo-

What is claimed:

1. A system for processing information, comprising:
a processor;
a module that is configured to apply a set of labels to a set of components using a probabilistic model;
a module that is configured to incorporate prototypical information in said probabilistic model by augmenting said probabilistic model with a conditional probability of the prototypical information; and
a module that is configured to determine whether said prototypical information is to be used in said probabilistic model based on a determination of at least one component in said set of components corresponding to a component in said prototypical information.

2. The system according to claim 1, wherein said set of components are words in a natural language.

3. The system according to claim 1, wherein said prototypical information includes a limited set of prototypical words for each possible label in said prototypical information.

4. The system according to claim 1, wherein said prototype information is preset to a specific distribution and a respective parameterization.

5. The system according to claim 1, wherein said prototype information has distribution and parameterization fitted automatically using standard statistical techniques.

6. The system according to claim 1, wherein said probabilistic model is a Hidden Markov Model.

7. The system according to claim 1, wherein said probabilistic model is a Latent Dirichlet Allocation Model.

8. A method for processing information, comprising:
configuring a probabilistic model to process a set of information;
determining by a computer processor that prototype information is to be used in said probabilistic model based on a determination of at least one component in said set of information corresponding to a component in a set of components included in the prototypical information;
adding, by the computer processor, said prototype information to said probabilistic model, wherein said prototype information includes a the set of components and an associated set of labels; and
assigning, by the computer processor, a first label to a first component of said set of information using said probabilistic model.

9. The method according to claim 8, wherein said set of information comprises a natural language.

10. The method according to claim 8, wherein said first component is at least one word.

11. The method according to claim 8, wherein said probabilistic model is a Hidden Markov Model.

12. The method according to claim 8, wherein said probabilistic model is a Latent Dirichlet Allocation Model.

13. The method according to claim 8, wherein at least one label from said set of labels is set to a specific value.

14. The method according to claim 8, wherein said first component is in said set of components.

15. A computer storage medium storing thereon computer executable instructions configured to process text, comprising:
an instruction configured to assign a label to a component according to a probabilistic model, wherein said probabilistic model includes incorporated prototype information;
an instruction configured to determine whether said component is included in said prototype information;
if said component is included in said prototype information, using said prototype information in said probabilistic model, otherwise not using said prototype information in said probabilistic model; and
an instruction configured to store said label assigned to said component.

16. The computer storage medium according to claim 15, wherein said probabilistic model includes at least one label configured to be assigned to said component, and wherein said at least one label is also configured to corresponds to a plurality of components.

17. The computer storage medium according to claim 15, further comprising an instruction configured to assign said label according to at least one additional probabilistic model.

18. The computer storage medium according to claim 15, wherein said component is similar but not exactly the same as a component in said prototype information.

19. The computer storage medium according to claim 15, wherein said probabilistic model is a Hidden Markov Model.

20. The computer storage medium according to claim 15, wherein said probabilistic model is a Latent Dirichlet Allocation Model.

* * * * *